United States Patent [19]

Smith

[11] Patent Number: 4,558,922
[45] Date of Patent: Dec. 17, 1985

[54] BRIGHT VIEWING AND FOCUSING SCREENS

[75] Inventor: Harry L. O. Smith, Cleveland, Tenn.

[73] Assignee: Beattie Systems, Inc., Cleveland, Tenn.

[21] Appl. No.: 608,474

[22] Filed: May 9, 1984

[51] Int. Cl.$^4$ .......................... G03B 13/24; G03B 2/60
[52] U.S. Cl. ..................................... 350/127; 354/200; 354/219
[58] Field of Search ........................ 354/200, 201, 219; 350/127, 128

[56] References Cited

U.S. PATENT DOCUMENTS 2,726,573 12/1955 Maloff .................................. 350/127
3,712,707 1/1973 Henkes ................................. 350/127
4,309,073 1/1982 Nishimura et al. ................. 350/128
4,339,188 7/1982 Smith .................................. 354/200

FOREIGN PATENT DOCUMENTS 713929 11/1931 France ................................ 354/200

Primary Examiner—A. A. Mathews
Attorney, Agent, or Firm—Alan Ruderman

[57] ABSTRACT

An image forming screen for optical systems has a Fresnel plastic lens having a replica of a ground glass surface on the surface opposite to that of the rings. The image surface is coated with a thin layer of optically clear epoxy material increasing the brightness of images formed on the screen.

4 Claims, 2 Drawing Figures

BRIGHT VIEWING AND FOCUSING SCREENS

BACKGROUND OF THE INVENTION

This invention relates to image forming screens for optical equipment, and more particularly to such a screen in which the image brightness is greatly enhanced uniformly over the surface of a plastic screen having a Fresnel lens thereon.

In my U.S. Pat. No. 4,339,188 an image forming viewing screen consisting of a ground glass viewing screen coated with an optical grade of epoxy bonding material is mounted in abutting contact with a Fresnel lens to obtain a very bright image. The rings of the Fresnel lens were disposed in abutting relationship with the coated surface of the screen. Due to space or other limitations in cameras such as single lens reflex cameras, and other optical devices where a two component system would be too thick or a glass focusing screen may be impractical, it is sometimes necessary to use an optical grade of synthetic plastic cast as a Fresnel lens integrally with the image forming screen on the opposite surface. The image brightness of such a screen is however poor in low light situations and it was not believed at the time I developed the subject matter of my aforesaid United States Patent that the brightness of a Fresnel lens-image forming surface combination itself could be increased.

SUMMARY OF THE INVENTION

Consequently, it is a primary object of the present invention to provide an image forming screen comprising a single element, that element being a body member having Fresnel lens rings on one surface thereof and having an image forming ground glass replica on the other surface providing a substantially brighter image than heretofore obtainable.

It is another object of the present invention to provide a single element image forming screen comprising a synthetic plastic member having spaced surfaces, one of the surfaces having concentric rings forming a Fresnel lens and the other surface having a replica of a ground glass surface and coated with a layer of optically clear material to increase the brightness of the screen.

Accordingly, the present invention provides an image forming screen comprising an optical grade of synthetic plastic material having a pair of spaced apart surfaces, one of the surfaces having a series of concentric rings forming a Fresnel lens, and the other surface having a replica of a ground glass surface forming the image surface, and the image surface being coated with a thin layer of optically clear epoxy material which is applied to the image surface as a uniformly thin coating. A screen so formed may be utilized in single lens reflex cameras in low light situations and when using telephoto lenses, tele-extenders and macro or micro lenses.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Prior to the present invention it was not believed that the brightness of a Fresnel lens-image forming surface combination could be increased by the process described in my aforesaid patent. However, after experimentation with optical grades of acrylic plastic material it has been found that brightness can be increased on a plastic diffusion surface such as found on the face opposite to the Fresnel rings by coating the surface in a manner similar to that disclosed in my aforesaid patent. Thus, a screen constructed in accordance with the present invention may be applicable to any optical system incorporating a real image forming surface and is particularly useful in the focusing view finder of a single lens reflex camera where focus can be obtained without split prisms which may black out in preview, low light or telephotograpy. In fact, one screen may be used with a wide range of lenses so that photographers could accomplish a multiplicity of photography jobs with fewer cameras, even where a number of lenses for various situations may be required.

Figure 1:
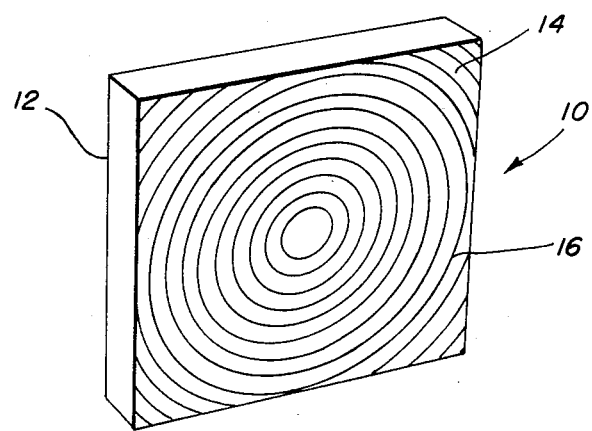
FIG. 1 is a diagramatic perspective view of a Fresnel lens illustrating the concentric rings.
Figure 2:
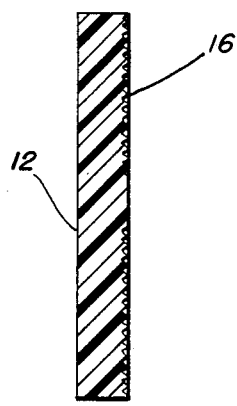
FIG. 2 is a cross-sectional view of the lens illustrated in FIG. 1.

FIG. 1 illustrates in diagramatic form a Fresnel lens 10 having a pair of opposed surfaces 12, 14, the surface 14 being formed with the Fresnel rings 16. Preferably the Fresnel lens is an optical grade of acrylic plastic and the rings are formed as known in the art. On the surface 12 opposite to the surface on which the rings 16 are formed, the plastic is cast with a replica of a ground glass surface. The surface 12, is thus replicated by making an electroform of a desired glass surface. Thus, the surface opposite to the surface with the rings 16 is a replica of a ground glass surface.

After the formation of the image screen with a desired diffusion surface upon which an image may be formed, the diffusion surface 12 is thereafter coated with a void filling thin coating of an optically clear material having an index of refraction between about 1.55 to 1.65 with a very high transmission of visible spectrum light in the range of at least 95 percent. The epoxy bonding material manufactured by Epoxy Technology, Inc. of Billerica, Ma. and sold under the name EPO-TEK 301-2 which was disclosed in my aforesaid United States Patent has the requisite properties and has been used successfully with the acrylic plastic screen. This material, which is a two part epoxy, mixed in the ratio of 100 parts of resin to 35 parts of catalytic hardener, has an index of refraction of about 1.564 with approximately 98 to 99 percent transmission of light in the visible wave length spectrum. The appropriate layer thickness is dependent upon the grit of the image forming surface. It has been found that it is practical to use the coating on surfaces having a character in the range of approximately 300 grit to 1,000. grit. The thickness of the coating is determined by the characteristics of the surface and the finer the character of the surface the less coating required to improve brightness.

The process for applying the epoxy compound is substantially identical to that disclosed in my aforesaid patent with the exception that it has been found that a mixture of water free alcohols and chlorinated hydrocarbon solvents to dissolve the epoxy compound and dilute it for application to the screen provides better results when the mixture includes 0.1 percent to 2 percent of 2-ethylhexanol.

When the image forming screen is constructed in the above manner an improvement in brightness of up to 4 f-stops may be provided. The most dramatic improvement is found when viewing conditions are poor, especially where there are typical low lighting levels. When one focuses through a viewing lens having an image forming screen as described, clear focusing is possible in situations where the subject could not be distinguished using prior art focusing screens.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. An image forming screen for optical systems comprising a substantially rectangular body formed from an optical grade of synthetic plastic material having spaced exterior surfaces, one of said surfaces comprising a series of concentric rings forming a Fresnel lens, and the other surface comprising the image surface, said image surface having a replica of a ground glass surface, said image surface being coated with a void filling thin layer of optically clear material having an index of refraction of about 1.55 to 1.65 and at least a 95 percent transmission of visible spectrum light.

2. An image forming screen as recited in claim 1, wherein said coated material is an epoxy.

3. An image forming screen as recited in claim 1, wherein said surfaces are planar.

4. An image forming screen as recited in claim 1, wherein said material is acrylic.

* * * * *